W. S. DOE.
DRY BATTERY CELL.
APPLICATION FILED MAY 11, 1908.

917,560.  Patented Apr. 6, 1909.

WITNESSES

INVENTOR
Walter Scott Doe
BY
ATTORNEYS

UNITED STATES PATENT OFFICE.

WALTER SCOTT DOE, OF JERSEY CITY, NEW JERSEY, ASSIGNOR OF ONE-HALF TO HARRY N. WITBECK, OF RAVENNA, OHIO.

DRY-BATTERY CELL.

No. 917,560.  Specification of Letters Patent.  Patented April 6, 1909.

Application filed May 11, 1908. Serial No. 432,005.

To all whom it may concern:

Be it known that I, WALTER SCOTT DOE, a citizen of the United States, and a resident of Jersey City, in the county of Hudson and State of New Jersey, have invented new and useful Improvements in Dry-Battery Cells, of which the following is a full, clear, and exact description.

The invention relates to electro-chemistry, and its object is to provide certain new and useful improvements in dry battery cells, whereby the exciting fluid usually discharged from the battery filling when the battery is in use is stored and reused in an effective manner, to increase the life of the battery and to render the same very effective at all times.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
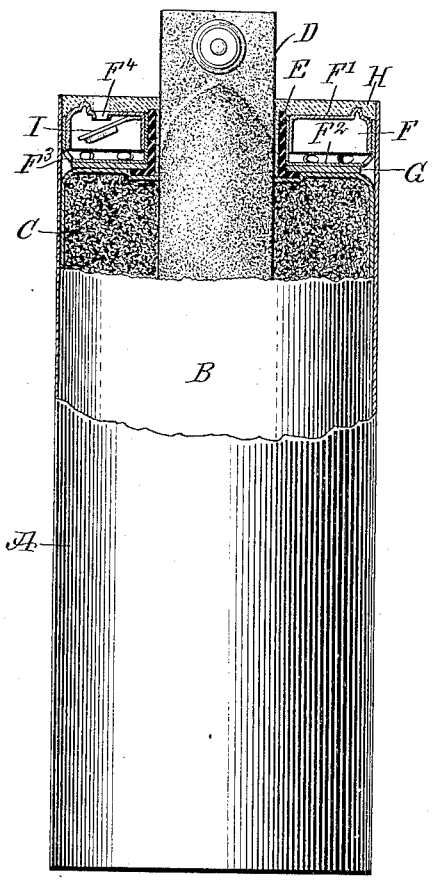
Figure 2:
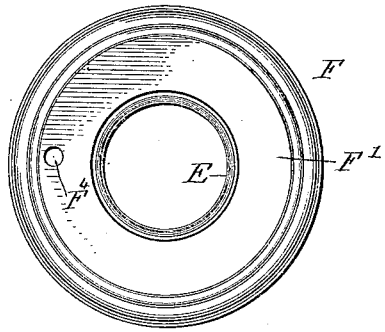
Figure 3:
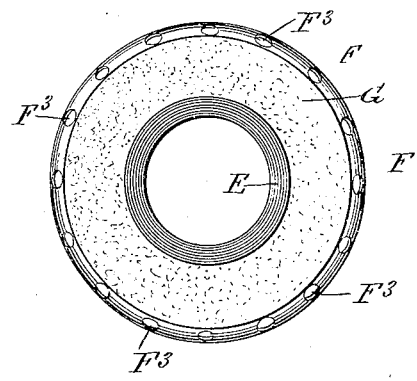

Figure 1 is a sectional side elevation of the improvement; Fig. 2 is a plan view of the reservoir; and Fig. 3 is an inverted plan view of the same.

In dry battery cells as heretofore constructed, the life of the battery is shortened and its efficacy is reduced, owing to the escape and waste of exciting fluid liberated within the cell from the battery filling at the time the battery is in use, or the temperature of the battery is raised by a rise in temperature of the surrounding air. In order to prevent the escape of the excitant thus liberated within the cell and to effectively re-use the excitant, the following arrangement is made:

The inclosing electrode A, of the dry battery cell is made in the form of a zinc can having a lining B, of paper or other bibulous material, and which contains the usual filling material C, packed around the inclosed electrode D, of carbon or other suitable material. A bushing E, of rubber or other suitable insulating material, surrounds the electrode D near the upper end thereof, and this bushing E is surrounded by an annular reservoir F, preferably made of zinc, in contact with the inclosing electrode A, as plainly illustrated in Fig. 1. The under side of the reservoir F rests on a washer G, of paper or other suitable bibulous material, and the top of the reservoir F and the washer G are sealed in the upper end of the inclosing electrode A by the usual seal H of wax or other suitable material. The reservoir F is preferably made of two cup-shaped annular members $F'$ and $F^2$, of which the top member $F'$ is inverted and fits into the bottom member $F^2$, as plainly shown in Fig. 1, and the bottom member $F^2$ of the reservoir F is provided with openings $F^3$, to permit the exciting fluid rising from the filling material C, to pass into the reservoir F and to be thus collected in the latter during the time the battery is in use. When the battery is at rest, the collected generating fluid or excitant can flow out of the reservoir F by way of the openings $F^3$ onto the bibulous lining B, to be absorbed by the latter and to thus keep the said lining in a properly moist condition. It will also be noticed that when the battery is not in use, the previously collected exciting fluid flows out of the reservoir F onto the lining B, thus moistening the same, to insure the proper conductivity thereof. It will further be noticed that by having the washer G, the latter is moistened by the liberated fluid. The bibulous washer G takes up the superfluous moisture previous to the sealing in of the reservoir F, and the moisture thus taken up by the washer excites the zinc surface of the reservoir body, thereby assuring additional amperage.

The top member $F'$ of the reservoir F is provided with a vent hole $F^4$, normally open, and adapted to be closed by a valve I arranged within the reservoir F. Thus in case the battery cell is placed upside down after use, the valve I closes the vent opening $F^4$, so that the exciting fluid collected in the reservoir F is retained therein and not lost.

By the use of the improvement described, more excitant can be put in the cells without leakage, as the reservoir takes care of any excess excitant which is returned to the lining and filling of the cell, for re-use in the manner described.

Having thus described my invention, I claim as new and desire to secure by Letters Patent:

1. A dry battery provided with a reservoir made of zinc, sealed in the top of the battery and insulated from the carbon electrode, the said reservoir being in contact with the inclosing electrode of the battery and having means for the excitant liberated from the battery filling to pass into the said reservoir and to be returned to the lining of the inclosing electrode of the battery.

2. A dry battery provided with a reservoir sealed in the top of the inclosing electrode and in contact therewith, an insulating bushing surrounding the inclosed electrode and surrounded by the said reservoir, and a washer of bibulous material on the under side of the reservoir.

3. A dry battery provided with a reservoir sealed in the top of the inclosing electrode and in contact therewith, and formed of two cup-shaped annular members.

4. A dry battery provided with a reservoir sealed in the top of the inclosing electrode and in contact therewith and formed of two cup-shaped annular members, of which the top member is inverted and fits into the bottom member, and the latter is provided with openings for the passage of the moisture discharged from the battery filling.

5. A dry battery provided with a reservoir sealed in the top of the inclosing electrode and in contact therewith and formed of two cup-shaped annular members, of which the top member is inverted and fits into the bottom member, and the latter is provided with openings for the passage of the moisture discharged from the battery filling, and a valve in the reservoir for closing a vent opening in the said top member.

In testimony whereof I have signed my name to this specification in the presence of two subscribing witnesses.

WALTER SCOTT DOE.

Witnesses:
JENNIE M. WITBECK
CHENEY D. INGELL.